United States Patent [19]
LeClair

[11] Patent Number: 5,717,838
[45] Date of Patent: Feb. 10, 1998

[54] COMPUTER CALIBRATION OF A COLOR PRINT IMAGE USING SUCCESSIVE REFINEMENT

[75] Inventor: Gregory A. LeClair, San Jose, Calif.

[73] Assignee: Seiko Epson Corporation, Tokyo, Japan

[21] Appl. No.: 550,915

[22] Filed: Oct. 31, 1995

[51] Int. Cl.⁶ .......................... G06K 15/00; H04N 1/40; H04N 1/46
[52] U.S. Cl. .......................... 395/109; 358/537; 358/447; 358/448; 358/520; 358/504; 358/452
[58] Field of Search .......................... 395/109, 101, 395/22, 50; 358/520, 537, 504, 518, 447, 448, 452, 453; 382/162, 167

[56] References Cited

U.S. PATENT DOCUMENTS

| | | | |
|---|---|---|---|
| 4,763,186 | 8/1988 | Belmares-Sarabia et al. | 358/520 |
| 4,962,421 | 10/1990 | Murai | 358/504 |
| 5,027,196 | 6/1991 | Ono et al. | 358/527 |
| 5,119,182 | 6/1992 | Tsuboi et al. | |
| 5,528,734 | 6/1996 | Sanchez | 395/115 |
| 5,563,720 | 10/1996 | Edgar et al. | 368/520 |

FOREIGN PATENT DOCUMENTS

| | | |
|---|---|---|
| 0 182 042 | 5/1986 | European Pat. Off. |
| 0 366 427 | 5/1990 | European Pat. Off. |

*Primary Examiner*—Dwayne Bost
*Assistant Examiner*—Tracy M. Legree

[57] ABSTRACT

A system calibrates a computer print image. A page driver receives an image having image properties, such as color scheme, image resolutions, contrast, etc., and sends it to a journal file for storage. A user interface enables selection of a property of the image. A journal file processor generates specific values based on a selected range of values for controlling the characteristics of the selected property. A rendering driver renders a modified version of the image for each generated value, and sends the modified versions to the printer. The user interface enables the selection of a preferred image from the rendered modified images. The journal file processor sends the values of the selected image to the driver settings file for storage. The user interface enables printing of the image using the values stored in the driver settings file, repetition of the above process for the same property over more specific range of values about the property value of the selected image, or repetition of the process for an entirely different property.

22 Claims, 8 Drawing Sheets

COMPUTER CALIBRATION OF A COLOR PRINT IMAGE USING SUCCESSIVE REFINEMENT

CROSS-REFERENCE TO RELATED APPLICATIONS

This application is related to co-pending application also filed on this date, entitled "System and Method Using a Split Printer Driver to Control a Computer Printer Device," Ser. No. 08/573,019, by inventors Gregory A. LeClair and Kazuo Nakamura, which subject matter is hereby incorporated by reference. Both of these related applications have been commonly assigned to Seiko Epson Corporation of Japan.

BACKGROUND OF THE INVENTION

1. Field of the Invention

The present invention relates generally to color print imaging. In particular, the invention relates to a system and method for calibrating a computer print image by successively displaying and refining the print image properties.

2. Description of the Background Art

The application of personal computers for use in printed imaging has become widespread. When a computer user generates an image, such as an advertisement or poster, the user designs the elements of the image on a computer screen and then routes the image to a printer for image production. Printer driver software programs facilitate the sizing and page placement of image data by allowing such functions as resizing of the image, image rotation, and margins selection. Many conventional printer drivers, especially for many of the newer color printers, permit adjustment of such parameters as color, resolution, contrast and the like. However, the actual characteristics of the printed image are difficult to predict, since many factors contribute to how the ink will finally dry on a particular piece of paper. Typical variables which effect the print image include ink dye pigmentation, paper type, paper coatings, humidity, temperature and the method used for combining colors.

Thus, it is common for an image designer to print and re-print an image in order to refine the properties of the image and thereby create a desired design or effect. Furthermore, computer screens do not display exact hard copy renditions of an image. Video displays generate color according to the RGB model. According to the RGB model, all colors of visible light may be made by combining within a single pixel red, green, and blue light of select intensities. The ratios of red, green and blue light to each other determine the color of the pixel. On the other hand, printers generate color using the CMY model. According to the CMY model, all colors of light may be made by combining cyan, magenta, and yellow. Cyan, magenta and yellow are the complements to red, green and blue, respectively, and are based on the rule that color is specified by what is removed or subtracted from white light. Printers use the CMY model instead of the RGB model due to the subtractive qualities of ink from white paper. For example, cyan is considered to subtract red from white light, while in the RGB model cyan is considered the addition of blue and green. Similarly, yellow absorbs blue light, and is the combination of red and green. A surface coated with cyan and yellow ink absorbs red and blue, leaving only green to be reflected. Realistically, displaying green on a video display does not provide the identical color of cyan and yellow on white paper. Thus, because video and printers use different color models, it is even more difficult for a user to anticipate optimum color schemes.

Based on such variables as the image color matching capabilities and the dots per inch (DPI) of certain printers, as well as the size of a particular image, printing can take as long as thirty minutes or more per hard copy. Thus, when successively refining the properties of an image by printing an image, modifying the image properties based on anticipated results, re-printing the image, and so on, a user of such conventional imaging programs wastes time, computer resources and natural resources. Therefore, a system and method is needed to facilitate the successive refinement of image color schemes.

SUMMARY OF THE INVENTION

The present invention overcomes the limitations and deficiencies of the prior art with a system and method for calibrating a computer print image by successively displaying and refining the print image properties. The system includes a central processing unit (CPU) that connects with a display device, and input device, a data storage device, a printer and memory. The memory advantageously stores a page driver, a journal file, a journal file processor, a user interface, a rendering driver, and a driver settings file. The routines in the memory are used by the CPU to provide a system that calibrates a computer print image. The page driver receives an image having image properties, such as color scheme, image resolutions, contrast, etc., and sends it to the journal file for storage. The user interface enables selection of a property of the image, and a range of values for controlling the characteristics of the selected property. The journal file processor generates specific values for the selected property based on the selected range. The rendering driver renders a modified version of the image for each generated value, and sends the modified versions of the image to printer 180. The user interface enables the selection of a preferred image from the rendered modified images. The journal file processor sends the values of the selected image to the driver settings file for storage. The user interface enables printing of the image using the values stored in the driver settings file, repetition of the above process for more specific range of values about the value of the selected image, or repetition of the process for a different property.

The present invention also comprises a method for successively refining a computer print image by generating sets of thumbnail images based on variable property values. The method starts by receiving a computer print image and a variable property range to be used for generating the first set of thumbnail images. A set of property values are generated based on the number of thumbnail images to be generated within the variable property range. For example, if the size of the set is three, and the variable property ranges from −50 to +50, the property values generated will account for three values across the range, such as −33, 0 and +33. A thumbnail image is rendered using each of the values for the variable property. After the thumbnail images are rendered, a preferred thumbnail image from the set may be selected and printed, or a preferred thumbnail image and a variable property may be selected for rendering a new set of thumbnail images. In a successive rendering, when the same property is selected the generated values will account for the range of values about the value of the selected thumbnail image, thereby refining the particular property.

DETAILED DESCRIPTION OF THE PREFERRED EMBODIMENT

Figure 1:
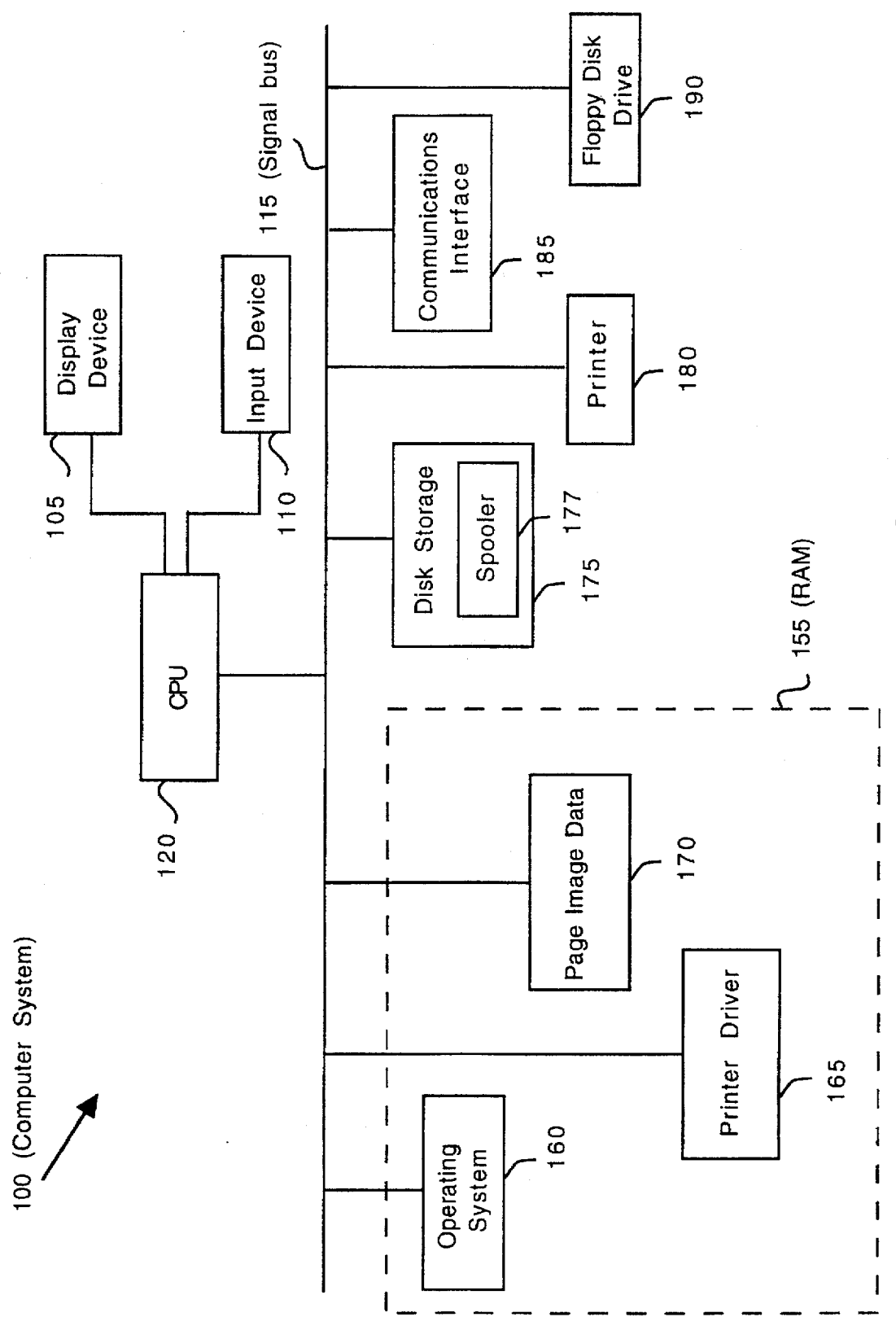
FIG. 1 is a block diagram of a preferred computer system having a printer driver, in accordance with the present invention.

Referring now to FIG. 1, a block diagram is shown of a computer system 100, preferably a microprocessor personal computer, such as the Pentium-based, Epson Action Tower 8200 computer, manufactured by Seiko Epson Corporation of Japan. Computer system 100 includes a CPU 120. An input device 110, such as a keyboard and mouse, and an output device 105, such as a CRT, are coupled to a CPU 120. Preferably, computer system 100 further comprises a block of conventional random access memory (RAM) 155, a printer 180, communications interface 185, and floppy disk drive 190 are also coupled via signal bus 115 to CPU 120.

The RAM 155 is used to store operating instructions and data which control and facilitate operation of the CPU 120. Operating instructions 160 preferably contained within RAM 155 consist of sequences of programmed instructions which when executed by CPU 120, enable operation by the CPU 120 on stored data. Printer driver 165 is a programmed sequence of instructions which when executed by CPU 120 allows stored data to be formatted and printed at printer 180. Page image data 170 is stored data, waiting to be processed by printer driver 165 for printing at printer 180. Page image data 170 is conventionally formatted in page length blocks. Printer driver 165 may be initially stored in disk storage 175 and loaded into RAM 170 prior to execution by CPU 120. Disk storage 175 has a spooler 177 for storing documents waiting to be printed at printer 180. Floppy disk drive 190 enables storing printer driver 165 onto a removable storage medium.

Figure 2:
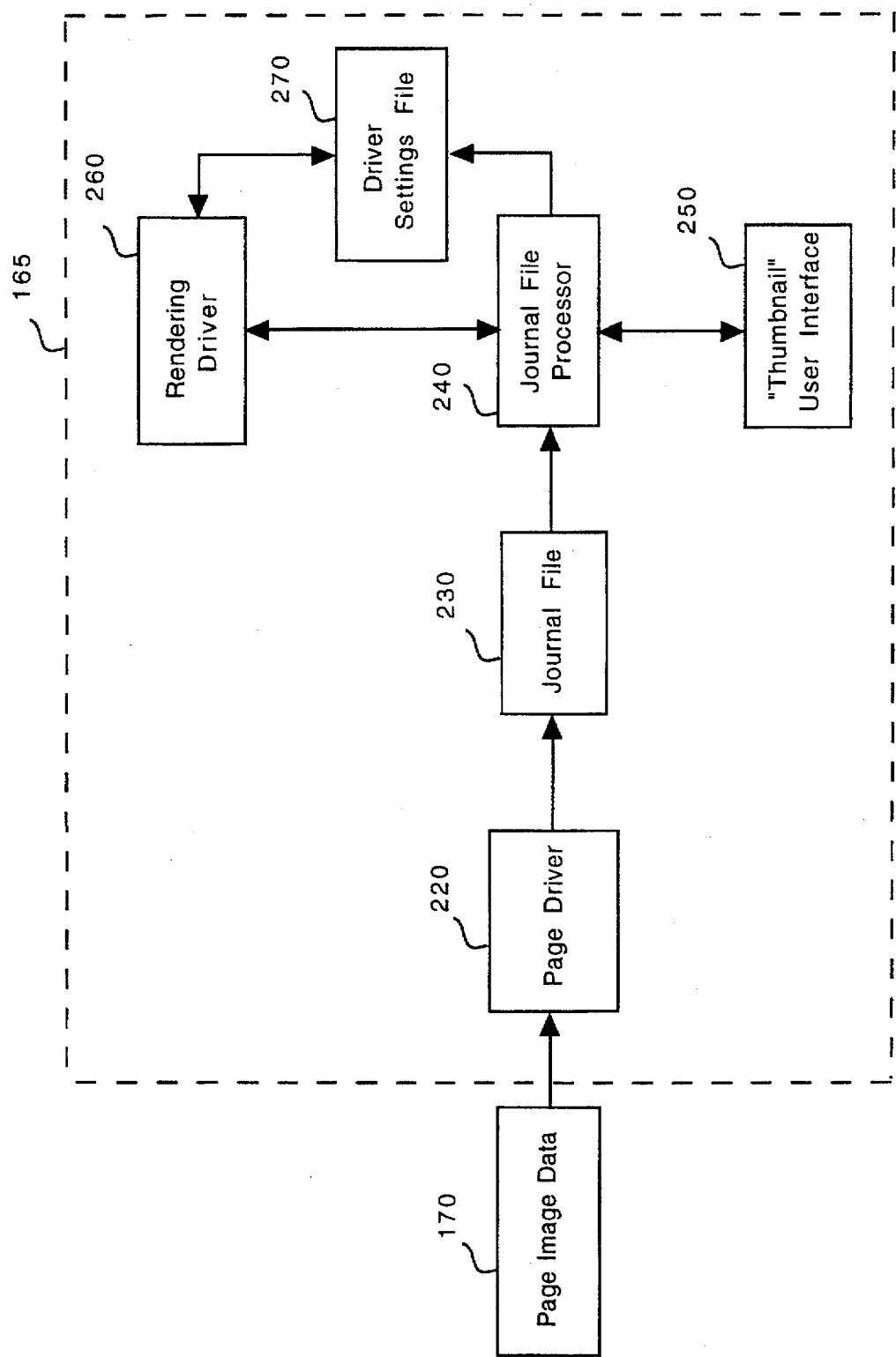
FIG. 2 is a block diagram of the printer driver of FIG. 1.

Referring now to FIG. 2, printer driver 165 of FIG. 1 is illustrated. Printer driver 165 is a program comprising several routines, including a page driver 220, a journal file 230, a journal file processor 240, a user interface 250, a rendering driver 260, and a driver settings file 270. At the time of printing, page image data 170 is transmitted by the CPU 120 along the data bus 115 to the printer driver 165. Page image data 170 is conventionally received by the page driver 220 as a conventional series of image portions. These image portions are to be transferred to the print medium (such as paper) by printer 180. Page driver 220 gathers the image portions, places the portions into a single page format that represents each page of an image, and then sends the formatted page image data 170 to the journal file 230. Journal file 230 is a collection of the formatted page image data 170 and the drawing commands needed to render a printed image from the data 170. The drawing commands include conventional pointers to program subroutines that specify the text font, object color, object size, object alignment, etc.

Journal file processor 240 gathers the formatted page image data 170 and all requisite drawing commands from the journal file 230, and sends the gathered information to rendering driver 260. Rendering driver 260 applies the drawing commands to page image data 170 and generates pixel data, thereby rendering the image. Rendering driver 260 then sends the rendered image to the journal file processor 240, which in turn sends the image to the user.

User interface 250 is a programmed software routine, which enables the user to view the image prior to printing and to request user instructions related to specific printing options. After viewing the image on the screen, the user can instruct rendering driver 260 to send the image to the spooler 177, and consequently to printer 180. Optionally, utilizing the user interface 250, the user can instruct the printer driver 165 to enter a color calibration process which enables successive refinement of the printed image. This successive refinement process consists of printing a set of reduced size ("thumbnail") images at printer 180 based on a set of variable properties. For example, a preferred thumbnail image is selected from the set and while a subset of the variable properties associated with the preferred image is held constant, a second set of thumbnail images is printed. Again, a preferred thumbnail image is selected and while a second subset of the variable properties is additionally held constant, a third set of thumbnail images is printed. The process repeats until a set of variable properties is determined and a refined image can be printed at printer 180. The determined set of variable properties is sent to driver settings file 270.

In order to render an image, rendering driver 260 retrieves printer driver settings information from the driver settings file 270. File 270 contains information for controlling such driver settings as image resolution, color information, printable area, and other printer options, such as image quality to print (i.e. "draft," "normal," or "high-resolution"). The driver settings contained in file 270 control all viewing modes of driver 165, including "initial", "thumbnail" and "final" view modes. In "initial" view mode, journal file processor 240 gathers the selected settings information for the image from journal file 230, including an initial color scheme, initial resolution, etc., and transmits the initial information to driver settings file 270. Rendering driver 260 uses the initial driver settings to render the image without image refinement on printer 180 using conventional imaging techniques.

In "thumbnail" mode, journal file processor 240 generates "thumbnail" driver settings, and transmits them to rendering driver 260 and driver settings 270. Rendering driver 260 uses the thumbnail driver settings to render the thumbnail versions of the image to be printed. The thumbnail driver settings include a minimum value "A" and a maximum value "B." The range from A to B specify the total range of a particular variable property, as limited by the video and computer hardware. For example, Contrast having a value of A has minimum Contrast, and Contrast having a value of B has maximum Contrast. In one embodiment, A may equal −50 and B may equal +50, with 0 being the median contrast.

The preferred six variable properties of an image contained in driver settings file 270 include Red Bias, Green Bias, Blue Bias, Brightness, Saturation, and Contrast. Based on the RGB model, Red Bias, Green Bias, and Blue Bias control the visible color of emitted light. Brightness is the luminosity or amount of light incident upon a specified area. To modify the Brightness of a pixel, the RGB values are conventionally modified by a constant so that the ratios among the three colors of light remain unmodified. The richness or purity of a particular color is referred to as Saturation, and can also be controlled by modifying the RGB values in a conventional manner. Lastly, Contrast refers to how far the whitest whites are from the blackest blacks in a video waveform, and can be conventionally controlled by modifying the range of possible RGB values.

Journal file processor 240 varies the value of at least one selected property. By varying a property and transmitting the values to rendering driver 260, journal file processor 240 generates a set of modified thumbnail versions of an image. By varying two of the properties across a selected range of values (R), journal file processor 240 generates a two-dimensional array of thumbnail images. Initially, a selected property is modified across the entire range from the minimum value A to the maximum value B. The dimensions of an array, and thus the increment between contiguous thumbnail versions, are controlled by matrix dimensions X(max) and Y(max). Matrix dimensions X(max) and Y(max) are contained in driver settings file 270. The preferred matrix dimensions X(max) and Y(max) both equal five, thereby presenting twenty-five thumbnail images in the array. However, user interface 250 enables user selection of other matrix dimensions. The incremental modification (IM) between contiguous versions is preferably equal to the range B-A divided by a matrix dimension X or Y. The starting value equals to A+IM/2. For example, in a five by five array, modified over the range from −50 to +50, the IM=100/5=20, and the starting point is equal to −50+20/2=−40. Thus, the values used for the thumbnail images equal −40, −20, 0, +20, +40, respectively. However, the modification value for each thumbnail image can be determined using a different algorithm, such as a logarithmic scale. Rendering driver 260 uses these values to render the thumbnail images.

Journal file processor 240 determines the size of thumbnail images by reducing the image enough so that an X by Y array of images will print on a single sheet of paper. As the array of images becomes larger, the size of an individual thumbnail image is made smaller. The preferred minimum dimensions of a thumbnail image is about two inches by one inch. Alternatively, the size of a thumbnail image may be reduced using a scaling factor.

The array of thumbnail images is sent to user interface 250 and printer 180, and the user selects the preferred version from the array via user interface 250 and input device 110. Based on the suitability of the selected thumbnail image, the user can either repeat the thumbnail mode for a new set of values based on the selected image, or enter a "final" mode. In final mode, rendering driver 260 uses the driver settings specified in the final iteration of the thumbnail mode in order to print the refined image. If the user does not consider the selected thumbnail image to be suitable, the thumbnail mode can be repeated and a second set of modified thumbnail images can be generated based on the selected image. Journal file processor 240 generates a new set of thumbnail driver settings by holding constant the matrix values selected by the user from the first array and by incrementally varying one or more additional variable properties of the selected image. In creating a new array of thumbnail images, a new IM and starting point is determined, as described in detail with reference to FIGS. 7 and 8 below. Based on the new set of values, rendering driver 260 generates a successive array of modified thumbnail images. The process repeats until a suitably refined image is generated.

Figure 3:
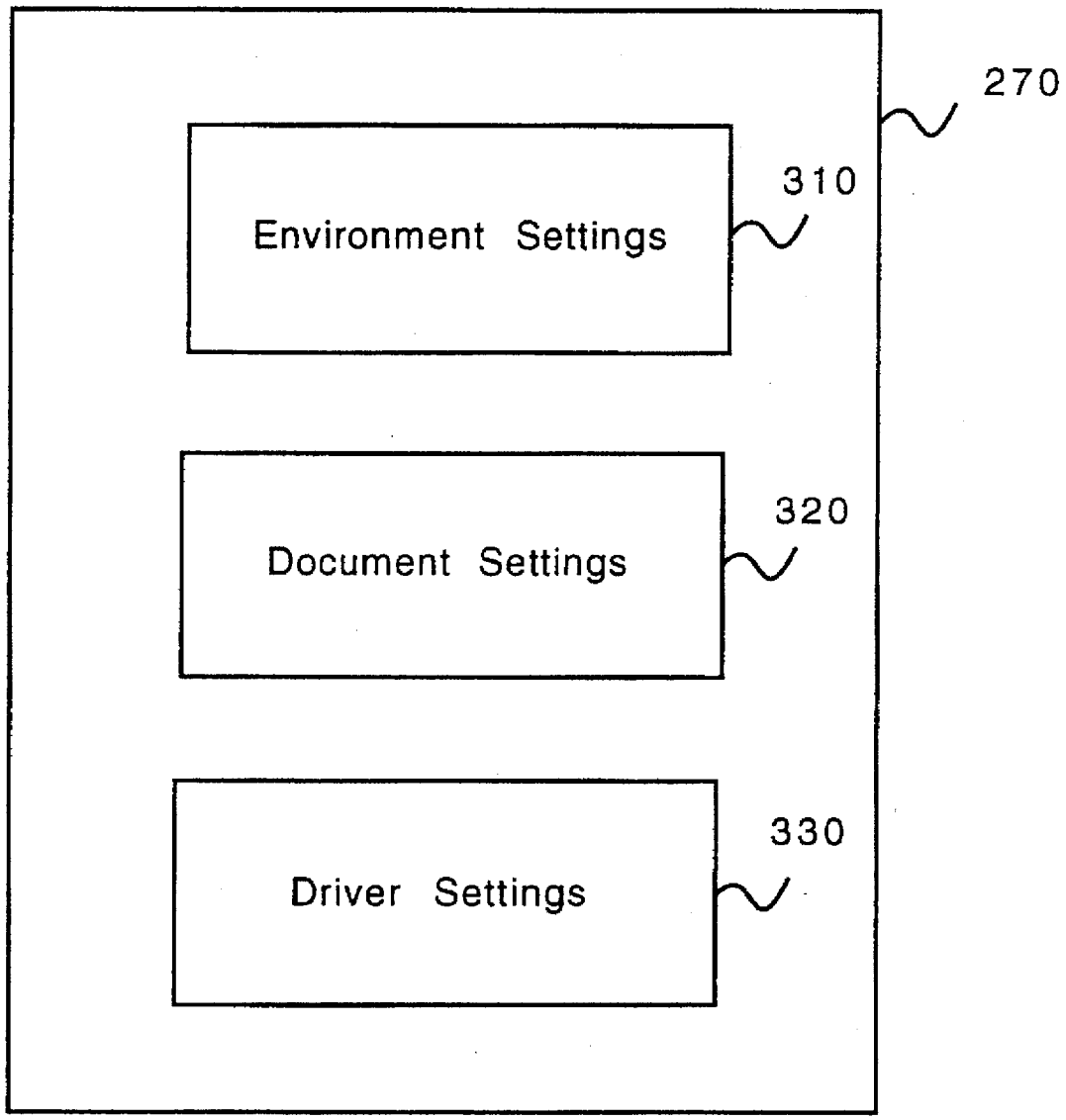
FIG. 3 is a schematic diagram of the driver settings file of FIG. 2.

Referring now to FIG. 3, a block diagram illustrating the driver settings file 270 of FIG. 2 is shown. Driver settings file 270 includes program data comprising a conventional environment settings 310, a conventional document settings 320, and a driver settings 330. Environment settings 310 conventionally includes the default parameters required by the environment specifying page size, resolution, driver version information, imagable area, device capabilities, color mode, imaging mode, etc. Document settings 320 includes the information for printing a particular document, including page margins, printable area, page layout, etc. As stated above, driver settings 330 includes information for controlling printer options, color information (such as Red Bias, Green Bias, Blue Bias, Brightness, Saturation and Contrast), user interface options (such as window size, placement, whether a pull-down menu or dialog box is to be used, etc.) as well as manufacturer and model number of the printer 180.

Figure 4:
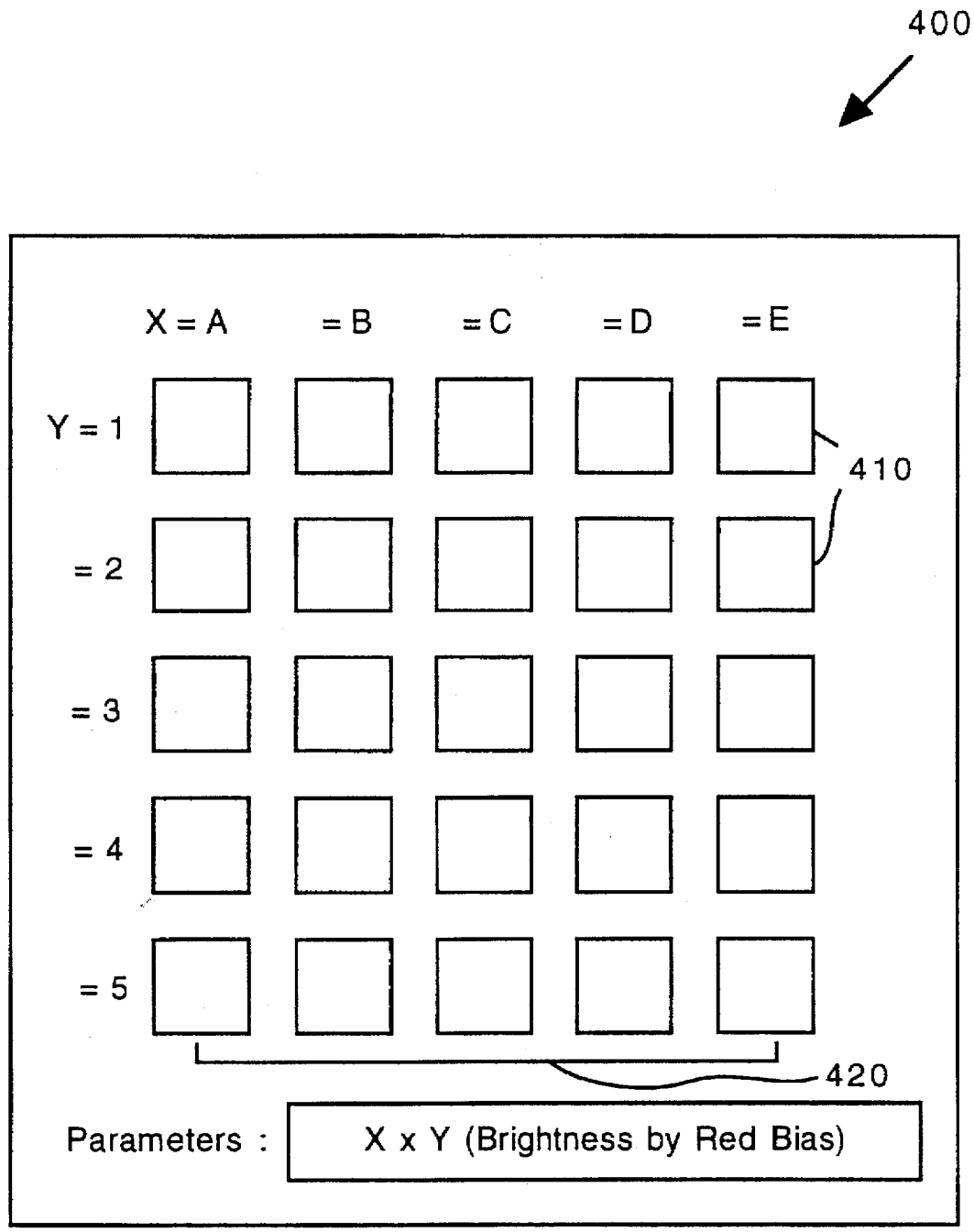
FIG. 4 is a window illustrating a two-dimensional array of images based on the thumbnail user interface.

Referring now to FIG. 4, a window 400 based on user interface 250 illustrating an array 420 of thumbnail images 410 is shown. The size of the array 420 is five by five, i.e. X(max)=5 and Y(max)=5. In this example, X coordinates refer to the level of Brightness, and Y coordinates refer to the level of Red Bias. For increasing X, the Brightness value increases. For increasing Y, the Red Bias increases.

As stated above, the incremental modifications are determined by X(max), Y(max) and the range R1 to R2 over which variable properties of Brightness and Red Bias are being modified. Assuming the range R1 to R2 is the preferred range from −50 to +50, the preferred incremental modification corresponding to X is 100/5=20, and starts at −50+20/2=−40. Thus, the preferred Brightness values in the array are −40, −20, 0, 20, 40. For the thumbnail images in column X=C, the images 410 have a median Brightness (Brightness value=0), and varying Red Bias. For the thumbnail images 410 in the row Y=3, the images have a median Red Bias (Red Bias=0), and varying Brightness. Thus, the thumbnail image 410 at X,Y=C,3 (value=0,0) has a median Brightness and Red bias, and all surrounding images 410 have incremental modifications. It will be appreciated that the Brightness value in the array starts at −40 and not −50, so that if a preferred image having a Brightness value of −40 is selected, a successive array can be generated having Brightness values incrementally modified about −40, i.e. over the new range R=−50 to −30. If the Brightness value had a starting value of −50, Brightness in the successive array could not be reduced, since −50 equals the minimum value A. It will be further appreciated that the thumbnail images in the center column (i.e. X=C) of such a successive array would have the same Brightness value as a selected thumbnail image, i.e. a Brightness value of −40.

A user prints the array 420 of thumbnail images 410 to determine a preferred image. The preferred image can be selected from the array 420 using any selection technique, such as positioning the cursor over the preferred image 410 and performing a mouse-down operation, or typing into a dialog box (not shown) a character string pertaining to the selected image 410, such as "C2." The user can then instruct the system 165 to print the refined image 410 or repeat the thumbnail mode based on the selected thumbnail image 410.

Figure 5:
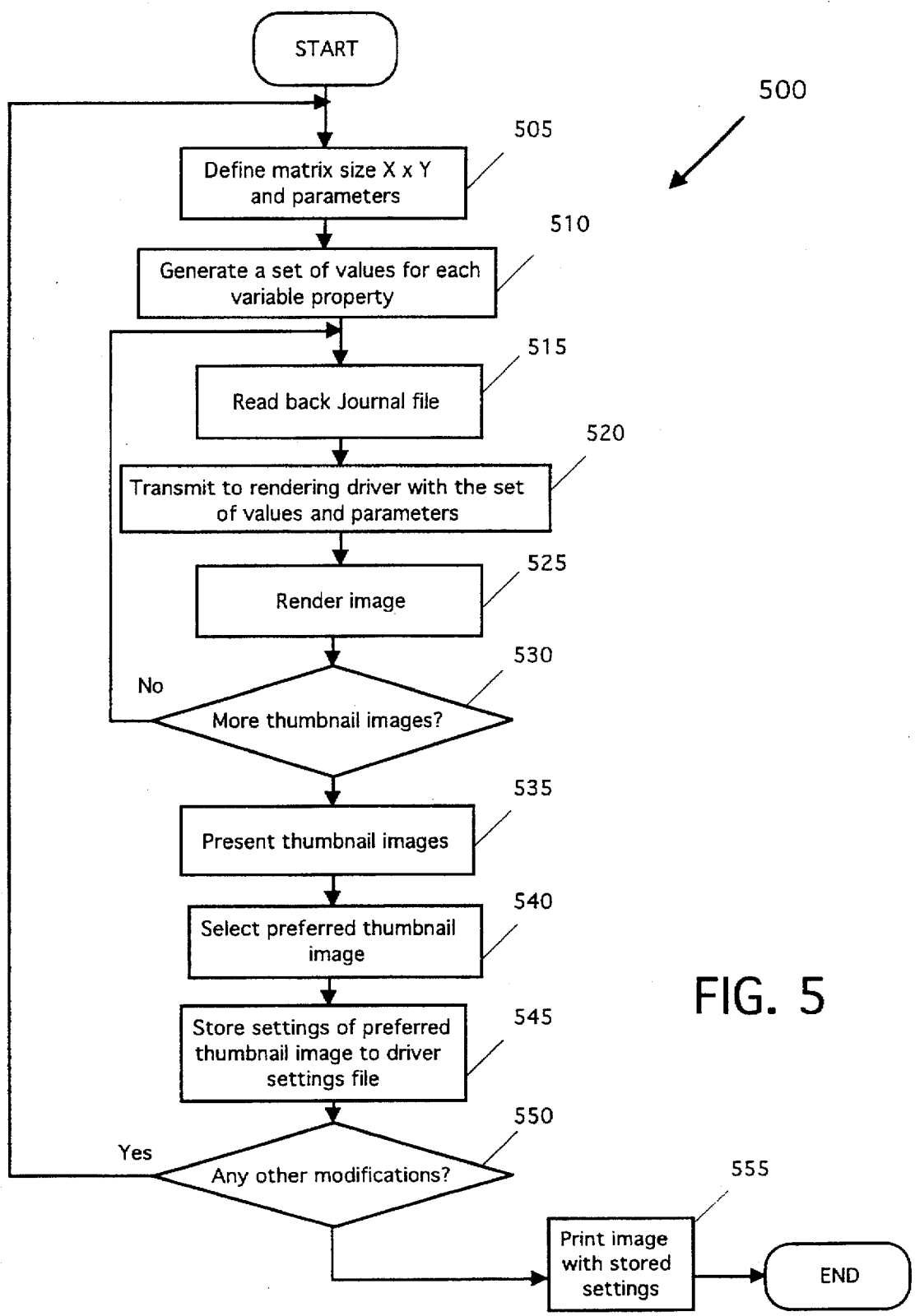
FIG. 5 is a flowchart illustrating the preferred method 500 for generating thumbnail versions of a page image.

Referring now to FIG. 5, a flowchart is shown illustrating the preferred method 500 for generating thumbnail images 410 of a page image. Method 500 starts by defining 505 the matrix size X(max) by Y(max) and additional parameters. The additional parameters include which properties are to be modified when generating thumbnail versions of an image, and the range of values over which to modify each property. Using the matrix values, and the range of values, a set of values for each variable property is generated 510. For example, if the matrix is three by one, and the range of values over which to modify a single property, such as Saturation, is −30 to +30, the thumbnail images will preferably be varied using an incremental modification of 60/3= 20 and a starting value of −30+20/2=−20. Thus, the Saturation values in each of the thumbnail images 410 is −20, 0, and +20, respectively.

After generating 510 the matrix values, the page image data is read back 515 from the journal file, and transmitted 520 to the rendering driver 260 with the set of values and parameters. Using the page image data, the set of values, and parameters, the rendering driver renders 525 each thumbnail image 410. As illustrated in block 530, the data is read back 515 and transmitted 520 until each of the thumbnail images 410 has been rendered 525 by the rendering driver 260. In the three by one example, the page image data 210 is read back 520 three times using the Saturation values of −20, 0, +20. The rendering driver 260 presents 535 the thumbnail images 410 to the user via printer 180.

After presenting 535 the thumbnail images 410 to the user, the user examines the images 410 image array 420 and selects 540 the preferred image from the set of displayed images. The driver settings, i.e. the values and parameters of the selected thumbnail image 410, are stored 545 in the driver settings file 270. As illustrated in block 550, if the selected image requires additional modifications to generate a refined image, method 500 repeats. If the settings for the selected image are suitable for printing, the image is printed at printer 180 using those settings, and the method 500 ends.

Figure 6:
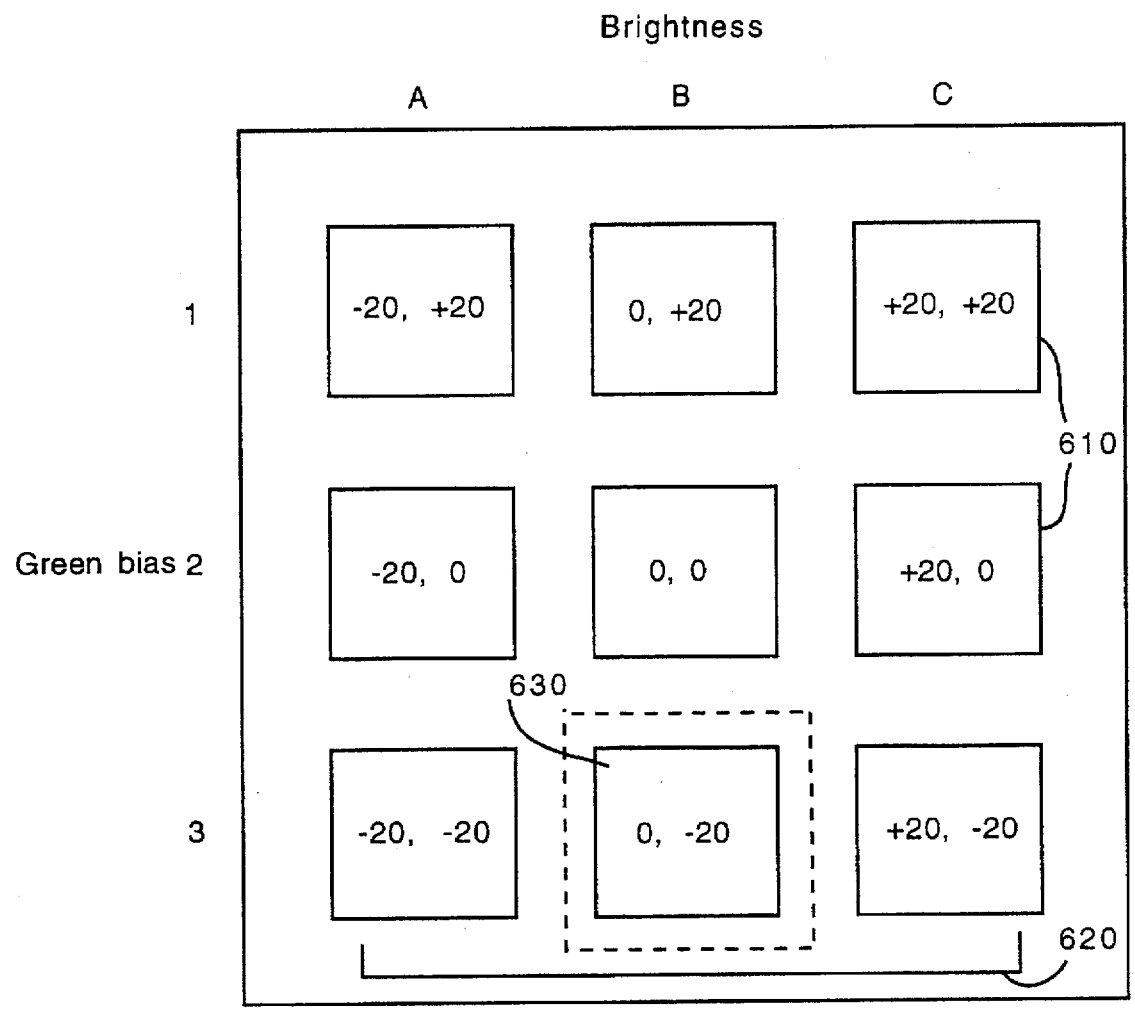
FIG. 6 is a window illustrating a two-dimensional array of thumbnail images for a first set of values.

Referring now to FIG. 6, a two-dimensional image array of thumbnail images 610 is shown following a first iteration of method 500, in accordance with the preferred embodiment. Continuing with the example of FIG. 5, the two properties Brightness and Green Bias are selected, while limiting the dimensions of the image array to three by three. Assuming in this case the range A to B is specified as −30 to +30, the journal file processor 240 generates an incremental modification, namely, 60/3=20, and a starting value, namely, −30+20/2=−20. Thus, the values for each of the properties in the array are −20, 0, and +20, respectively. In other words, the bottom left version has a Brightness of −20 and a Green Bias of −20. Brightness increases in increments of +20 as X increases (i.e. to the right), and Green Bias increases in increments of +20 as Y increases (i.e. upward).

The thumbnail images 610 are printed at printer 180, and the user selects a preferred image 630 using user interface 250 and input device 110. Assuming that the image 630 at B3 is selected, the Brightness value of zero and the Green Bias of −20 are stored in driver settings 330. If the user considers the image 630 suitable, i.e. sufficiently refined for its intended purpose, the image 630 is printed in final form with proper size and quality, using stored driver settings 330. Otherwise, the thumbnail mode is preferably repeated for at least one newly selected variable property. If a newly selected property is not the same as a previously selected property, then the range and incremental value is as determined above, namely, −30 to +30 with an IM of twenty, starting at a value of −20. If a newly selected property is the same as the selected property of the previous iteration, the range of values for modifying the image is adjusted about the value of the property of the selected version. These two possibilities are illustrated in FIGS. 7 and 8.

Figure 7:
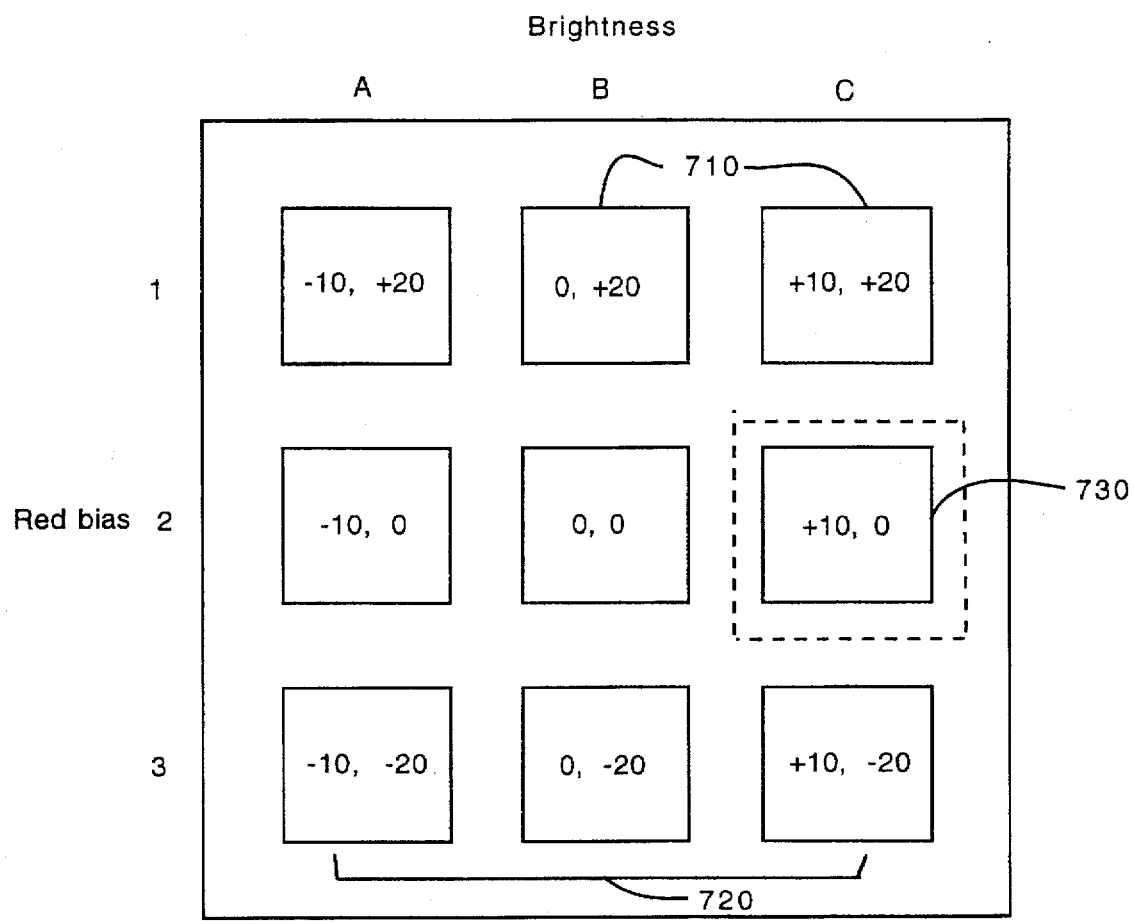
FIG. 7 is a window illustrating a two-dimensional array of thumbnail images for a second set of values.
Figure 8:
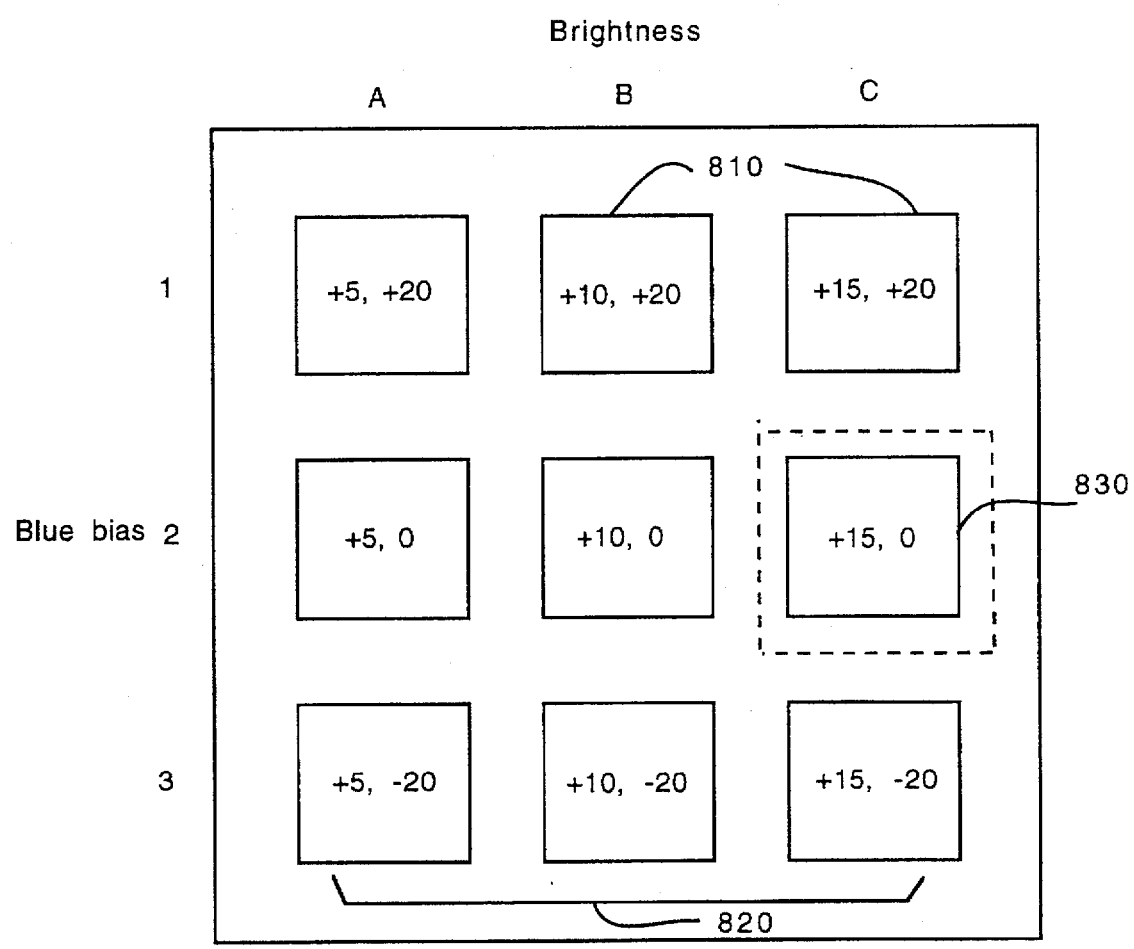
FIG. 8 is a window illustrating a two-dimensional array of thumbnail images for a third set of values.

Referring now to FIG. 7, a two-dimensional array 720 of thumbnail images 710 for a second iteration is shown. User interface 250 and input device 110 generate the selection of two variable properties, namely, Brightness and Red Bias. Brightness is being re-selected, and Red Bias is being selected for the first time. It will be appreciated that the previously selected value for Green Bias remains constant at −20. Since Red Bias is being modified for the first time, the range of values over which to modify Red Bias is the same as the range determined for Brightness and Green Bias in FIG. 6. However, since the value for Brightness has already gone through a previous iteration, the range and incremental modification for Brightness must be adjusted.

The range and incremental modification for the second iteration of Brightness accounts for the range of possibilities between the previous array 620 of thumbnail images 610. The range is preferably equal to the previous incremental modification, with the center value at the Brightness value of the selected image 630. That is, the previous incremental modification was twenty, and the selected Brightness value is zero. Thus, the range for the second iteration is preferably twenty with a center Brightness of zero. The new incremental modification is equal to the new range divided by the number of increments (i.e. new IM=previous IM/(X−1)). Brightness values for this array equal −10, 0, +10, respectively.

Again, the thumbnail images 710 of this second iteration are printed at printer 180, and the user selects a preferred thumbnail image 730 using user interface 250 and input device 110. If the image 730 at C2 is selected, the Brightness value of ten and the Red Bias of zero are stored in driver settings 330. The user can print the image, or can repeat the thumbnail mode for a new set of properties.

Referring now to FIG. 8, a two-dimensional array 820 of thumbnail images 810 for a third iteration is shown. In this figure, Brightness and Blue Bias are being modified to generate thumbnail images 810. Green bias remains constant at −20, and Red Bias now remains constant at zero. Similarly, because Blue Bias is being selected for the first time, Blue Bias is modified over the range −30 to +30, with an IM equal to twenty and starting at −20. Because Brightness is being modified for a third time, the range is the previous IM, or ten, the center Brightness value is the Brightness value of the second selected image 730, also ten, and the incremental modification equals ten divided by two total increments, or five. Thus, Brightness values for the third array 820 equal +5, +10, +15, respectively. The thumbnail images 810 of the third iteration are printed at printer 180, the user selects the preferred thumbnail image 830, and those values are sent to drivers settings 330. If the version at C2 is selected and considered sufficiently refined, the user prints the image in final form, with actual size and quality and using driver settings 330, namely, Green Bias equal to −20, Red Bias equal to zero, Blue Bias equal to zero, and Brightness equal to +15. Since Saturation and Contrast have not been adjusted, values for Saturation and Contrast equal zero.

The foregoing description of the preferred embodiments of the invention is only by way of example, and other variations of the above-described embodiments and methods are provided by the present invention. For example, a detailed description was provided for the generation of a two-dimensional array of thumbnail images. It would be obvious that the present system and methods apply to three-dimensional and n-dimensional arrays as well. Additionally, a wide variety of adjustment algorithms could be used in the refinement process, including choosing two different variables with each thumbnail image iteration. Furthermore, the preferred system embodied in the general purpose computer of FIG. 1 is equally effective if implemented as a component of a conventional processor-driven imaging device. For example, the printer driver 165 could be contained within a processor-driven printer, scanner, facsimile machine, document copier, or other related machine.

It is well understood that these conventional processor-driven devices can be thought of as special purpose computers, each containing a CPU 120, an operating system 160, etc. Also, components of this invention may be implemented using a programmed general purpose digital computer, using application specific integrated circuits, or using a network of interconnected conventional components and circuits. The embodiments described herein have been presented for purposes of illustration and are not intended to be exhaustive or limiting, and many variations and modifications are possible in light of the foregoing teaching. The system is limited only by the following claims.

What is claimed is:

1. A processor implemented method for refining a print image based on a plurality of printer property variables, the method comprising the steps:

(i) selecting first (X) and second (Y) property variables;

(ii) generating a range of values for each of the first and second property variables;

(iii) printing a two-dimensional array of thumbnail images such that each printed thumbnail image corresponds to an ordered pair (X,Y) of the generated ranges of X and Y values;

(iv) selecting a user-preferred image from the array of printed thumbnail images and storing the variable values (X and Y) corresponding to the selected image;

(v) repeating the above steps (i)–(iv) until a variable value for each of the plurality of printer property variables is stored; and (vi) producing a print image using the stored variable values.

2. The method of claim 1, wherein the first and second property variables are selected from the set consisting of contrast, brightness, saturation, red bias, green bias, and blue bias.

3. The method of claim 1, wherein the method is performed by a processor contained in a printer.

4. The method of claim 1, wherein the method is performed by a processor contained in a document copier.

5. The method of claim 1, wherein the method is performed by a processor contained in a general purpose computer.

6. A processor implemented method for refining a print image based on a plurality of printer property variables, the method comprising the steps of:

(i) selecting a property variable;

(ii) generating a range of values for the property variable including the step of generating an incremental modification (IM) equal to the range (B–A) divided by a set dimension, and a starting value equal to A+IM/2;

(iii) a set of thumbnail images such that each printed thumbnail image corresponds to a variable value of the generated range of values;

(iv) selecting a preferred image from the set of printed thumbnail images and storing the variable value corresponding to the selected image;

(v) repeating the above steps (i)–(iv) until a variable value for each of the plurality of printer property variables is stored; and (vi) producing a print image using the stored variable values.

7. A computer implemented method for refining a print image based on a plurality of printer property variables, the method comprising the steps of:

(i) selecting first (X) and second (Y) property variables;

(ii) generating a range of values for each of the first and second property variables;

(iii) printing a two-dimensional array of thumbnail images such that each printed thumbnail image corresponds to an ordered pair (X,Y) of the generated ranges of X and Y values;

(iv) selecting a user-preferred image from the array of printed thumbnail images and storing the variable values (X and Y) corresponding to the selected image;

(v) repeating steps (i) and (ii) for an additional pair of property variables;

(vi) repeating the printing of step (iii) while additionally using the stored variable values of step (iv);

(vii) repeating the above steps (i)–(vi) until a sufficiently refined print image is selected; and (viii) producing a print image using the stored variable values of the sufficiently refined print image.

8. The method of claim 7, wherein the property variables of step (i) are selected from the set consisting of contrast, brightness, saturation, red bias, green bias, and blue bias.

9. The method of claim 7, wherein the method is performed by a processor contained in a printer.

10. The method for calibrating a print image according to claim 7, wherein when repeating step (iii) at least one stored variable value of step (iv) is additionally used in printing the set of thumbnail images.

11. A computer implemented method for refining a print image based on a plurality of printer property variables, the method comprising the steps of:

(i) selecting a property variable;

(ii) generating a range of values for the property variable including the step of generating an incremental modification (IM) equal to the range (B–A) divided by a set dimension, and a starting value equal to A+IM/2;

(iii) printing a set of thumbnail images such that each printed thumbnail image corresponds to a variable value of the generated range of values;

(iv) selecting a preferred image from the set of printed thumbnail images and storing the variable value corresponding to the selected image;

(v) repeating steps (i) and (ii) for a new property variable;

(vi) repeating the printing of step (iii) while additionally using the stored variable value of step (iv);

(vii) repeating the above steps (i)–(vi) until a sufficiently refined print image is selected; and (viii) producing a print image using the stored variable values of the sufficiently refined print image.

12. A computer system for refining a print image based on a plurality of printer property variables comprising:

means for selecting first (X) and second (Y) property variables;

means for generating a range of values for each of the first and second property variables;

means for printing an array of thumbnail images such that each printed thumbnail image corresponds to an ordered pair (X,Y) of the generated ranges of X and Y values;

means for selecting a preferred image from the array of printed thumbnail images; and means for storing the variable values (X and Y) corresponding to the selected image.

13. The system according to claim 12, wherein the means for printing is a color printer.

14. The system according claim 12, wherein said system comprises a general purpose computer.

15. A system for refining a print image comprising:

memory containing refined property values specifying preferred properties of the print image, and a printer driver for rendering a set of thumbnail images based on the refined property values;

an input device for enabling the selection of a preferred thumbnail image from the set of thumbnail images;

a processor coupled to the memory and the input device for updating the refined property values with property values of the preferred thumbnail image; and an imaging device coupled to the processor for printing the print image using the refined property values;

wherein the printer driver further comprises a page driver for compiling the print image into a page format; and wherein the memory further comprises a journal file for storing print image data in page format.

16. The system according to claim 15, wherein the printer driver further comprises a user interface enabling the set of thumbnail images to be rendered across a range of print property values.

17. The system according to claim 15, wherein the print image memory includes a spooler for storing print images waiting to be printed at the imaging device.

18. The system according to claim 15, wherein the print driver further comprises a rendering driver for generating pixel data corresponding to each of the thumbnail images.

19. The system according to claim 15, wherein the printer driver further comprises a journal file processor for gathering the print image data from the journal file and generating a range of print property values for a print property.

20. A program storage medium storing computer program-readable code for causing an information processor to perform the steps of:

(i) selecting first (X) and second (Y) property variables;

(ii) generating a range of values for each of the first and second property variables;

(iii) printing a two-dimensional array of thumbnail images such that each printed thumbnail image corresponds to an ordered pair (X, Y) of the generated ranges of X and Y values;

(iv) selecting a user-preferred image from the array of printed thumbnail images and storing the variable values (X and Y) corresponding to the selected image;

(v) repeating the above steps (i)–(iv) until a variable value for each of the plurality of printer property variables is stored; and (vi) producing a print image using the stored variable values.

21. The medium of claim 20, wherein the first and second property variables are selected from the set consisting of contrast, brightness, saturation, red bias, green bias, and blue bias.

22. The medium of claim 20, wherein the step (ii) of generating a range of values includes the step of generating an incremental modification (IM) equal to the range (B−A) divided by a set dimension, and a starting value equal to A+IM/2.

* * * * *